(12) United States Patent
Liao

(10) Patent No.: US 11,302,130 B2
(45) Date of Patent: Apr. 12, 2022

(54) SMART LOCKING SYSTEM WITH BIOMETRICS AUTHENTICATION

(71) Applicant: Li-Shih Liao, Taoyuan (TW)

(72) Inventor: Li-Shih Liao, Taoyuan (TW)

( * ) Notice: Subject to any disclaimer, the term of this patent is extended or adjusted under 35 U.S.C. 154(b) by 0 days.

(21) Appl. No.: 17/088,950

(22) Filed: Nov. 4, 2020

(65) Prior Publication Data

US 2021/0049848 A1 Feb. 18, 2021

Related U.S. Application Data

(63) Continuation-in-part of application No. 16/299,344, filed on Mar. 12, 2019, now abandoned.

(30) Foreign Application Priority Data

Sep. 21, 2018 (TW) .................................. 107212936

(51) Int. Cl.
*G07C 9/00* (2020.01)
*G07C 9/26* (2020.01)
*G06K 9/00* (2022.01)

(52) U.S. Cl.
CPC ........... *G07C 9/26* (2020.01); *G06K 9/00355* (2013.01); *G06K 9/00597* (2013.01);
(Continued)

(58) Field of Classification Search
CPC ................. E05B 45/06; E05B 47/0001; E05B 2047/0095; E05B 47/0615; E05B 49/00; E05B 15/1614; E05B 17/10; E05B 1/0061; E05B 2047/0062; E05B 2047/0086; E05B 3/06; E05B 41/00; E05B 47/00; E05B 47/0638; E05B 67/22; E05B 2047/0058; E05B 2047/0064; E05B 81/80; E05B 81/82; E05B 2047/0085; E05B 47/0002; G06T 15/20; G06T 15/30; G06T 19/006;
(Continued)

(56) References Cited

U.S. PATENT DOCUMENTS

| 10,068,118 B2* | 9/2018 | Singhal .................... G06F 21/32 |
| 2003/0046540 A1* | 3/2003 | Nakamura ............. G07C 9/257 |
| | | 713/168 |

(Continued)

*Primary Examiner* — Dionne Pendleton
(74) *Attorney, Agent, or Firm* — Rosenberg, Klein & Lee

(57) ABSTRACT

A smart locking system with biometrics authentication allows a user with a portable electronic device installed with an application program and a biometrics characteristics extractor. The portable electronic device includes an identification code, a biometric characteristics retrieving module and an input unit. The application program has the identification code registered in a controller of a smart lock device and has the biometric characteristics retrieving module retrieve the biometric characteristics of the user. After matching and authentication of the application program, a password is produced and input into a biometric characteristics button of the input unit correspondingly. When the user is carrying the portable electronic device in the predetermined distance set in a Bluetooth receiver of the electronic device, the device automatically transmits a Bluetooth package to the controller and when the biometric characteristics button is touched and pressed, the controller is activated and operates the lock device via the driving circuit module.

12 Claims, 15 Drawing Sheets

(52) U.S. Cl.
CPC ..... *G07C 9/00174* (2013.01); *G07C 9/00182* (2013.01); *G07C 9/00309* (2013.01); *G07C 9/00563* (2013.01); *G07C 2009/0019* (2013.01); *G07C 2009/00769* (2013.01)

(58) Field of Classification Search
CPC ............. G06T 19/20; G06T 2219/2012; G06T 2219/2021; G07C 2009/00317; G07C 2009/00769; G07C 9/00309; G07C 9/00571; G07C 2009/00507; G07C 2009/00753; G07C 2009/00761; G07C 2009/00793; G07C 2009/00865; G07C 2009/00888; G07C 2009/00928; G07C 9/00563; G07C 9/26; G07C 9/00174; G07C 9/23; G07C 9/257; G07C 2009/00634; G07C 9/0069; G07C 9/25; G07C 2209/08; G07C 2009/00325; G07C 2009/00952; G07C 2209/62; G07C 2209/63; G07C 9/00658; G07C 9/00857; G07C 9/00944; G07C 9/27; G07C 2209/60; G07C 9/00182; G07C 9/00896; G07C 9/29; G07C 9/32; G08B 29/18; G08C 17/02; G08C 2201/20; G08C 2201/62; G08C 2201/91; G08C 2201/93; G08C 23/04; H04W 4/80; H04W 12/0608; H04W 12/06; H04W 12/08; H04W 4/021; H04W 4/025; H04W 4/70; G06F 21/32; G06F 21/35; G06F 3/021; G06F 3/0219; G06F 3/0227; H04L 63/083; H04L 63/0861; H04L 61/6054; B60R 25/209; B60R 25/23; G06Q 30/0251; H04B 5/0062; Y02D 70/00; Y02D 70/122; Y02D 70/124; Y02D 70/1262; Y02D 70/142; Y02D 70/144; Y02D 70/162; Y02D 70/166; Y02D 70/26; Y02D 70/42

See application file for complete search history.

(56) References Cited

U.S. PATENT DOCUMENTS

| | | | |
|---|---|---|---|
| 2015/0302738 A1* | 10/2015 | Geerlings | G07C 9/00571 340/5.25 |
| 2016/0217637 A1* | 7/2016 | Gengler | E05B 67/22 |
| 2019/0355195 A1* | 11/2019 | Hu | G07C 9/00571 |
| 2021/0225100 A1* | 7/2021 | Jones | G07C 9/00174 |

* cited by examiner

SMART LOCKING SYSTEM WITH BIOMETRICS AUTHENTICATION

This patent application is a continuation-in-part of Ser. No. 16/299,344 filed on Mar. 12, 2019.

BACKGROUND OF THE INVENTION

1. Field of the Invention

The invention relates to a smart locking system with biometrics authentication that has an application program on a portable electronic device registered with biometric characteristics and encoding passwords for operating the smart lock device.

2. Description of the Related Art

Nowadays it is common to have different locks installed around people's living environment to ensure safety and prevent from burglaries. The locks can be key locks, keycard locks, electronic locks, fingerprint locks, etc. However, the locks are developed based on improvement in the vulnerability of the locks instead of the complexity for the users to perform the unlocking process. Whether it is easy, convenient, fast enough or whether it is private enough to unlock the locks were never mentioned or paid attention to.

FIGS. 1 and 2 illustrated electronic locks connected to smartphones via Bluetooth and operated by identity authentication on the smartphones. When performing unlocking of such locks, the users are able to enjoy an easy, convenient and fast unlocking experience with privacy. Further structures of the electronic locks are described in the following.

FIG. 1 is a Bluetooth remote control lock disclosed in Taiwanese patent No. TWM466956. The invention includes an electronic lock 10 with a control unit 11 disposed therein and an infrared detection unit 12 arranged at a pre-determined position on the external surface of the electronic lock 10. The control unit 11 is coupled to the infrared detection unit 12 for detection and distinguishment of a shadow P of a user. When detecting and distinguishing the shadow P of the user, the control unit 11 is activated and therefore turns on the Bluetooth to connect with a smartphone 13 for identity authentication and further locking the electronic lock 10 or keeping the electronic lock 10 unlocked.

FIG. 2 is a Bluetooth electronic lock of August Home Inc. The product has an electronic lock 20 with a button 21 arranged on a surface of the electronic lock 20. When a user U presses the button 21, the Bluetooth of the electronic lock 20 would connect with the Bluetooth of a smartphone 22 for identity authentication and further locking the electronic lock 20 or keeping the electronic lock 20 unlocked.

FIG. 3 is an infrared face recognition system 30 disclosed in Taiwanese patent No. TWM464755. The system has an input unit 31, an image retrieving unit 32, an image producing unit 33, a detecting unit 34 and a database 35. The input unit 31 functions to produce an input signal. The image retrieving unit 32 includes at least one visible light camera 321 and at least one infrared camera 322 for retrieving a visitor's face image 38 in both visible light and infrared. The image producing unit 33 is connected to the image retrieving unit 32 for receiving the images of the visitor's face image 38 in visible light and infrared and producing an image signal by combination of both images. The database 35 has a plurality of images data stored. The detecting unit 34 is connected to the input unit 31, the image retrieving unit 32, the image producing unit 33, the database 25, an external door lock 36 and a notification unit 37. The system receives the input signal and produces an activating signal to operate the image retrieving unit 32 and receive the image signal; then the images in the database 35 are searched and compared for recognition. When the image is confirmed consistent to one of the images in the database 35, an unlocking signal is produced to unlock the door lock 36; when the image cannot be confirmed to any image in the database 35, a notification signal is produced to operate the notification unit 37.

However, in the electronic locks described above, there are problems in the unlocking process.

In the Bluetooth remote control lock disclosed in Taiwanese patent No. TWM466956, if the user is around the electronic lock 10 and the infrared detection unit 12 accidentally detects the user's shadow P, the electronic lock 10 would be unlocked accidentally, therefore resulting in safety issues.

In the Bluetooth electronic lock of August Home Inc., the user U has to be in front of the electronic lock 20 to press the button 21 for operation, therefore resulting in inconveniences.

The infrared face recognition system 30 disclosed in Taiwanese patent No. TWM464755 requires times for retrieving the visitor's face image 38 and for processing the image recognition with a huge amount of the face images stored in the database 35 and comparison with the visitor's face image 38, therefore resulting in a time-consuming and electricity-consuming process for the operation.

Therefore, it is desired to improve the shortcomings in the conventional electronic locks and provide a better solution to the problems.

SUMMARY OF THE INVENTION

A primary object of the present invention is to provide a smart locking system with biometrics authentication that allows a user to unlock a smart lock device by a portable electronic device with biometrics authentication, featuring safe, convenient and low consuming of electricity.

To achieve the objects above, the present invention comprises a smart lock device including a lock device and a controller, said controller coupled to a driving circuit module for controlling locking and unlocking of said lock device, the controller has a program code, and the program code is wrote by a main-program and multiple sub-programs; at least one electronic device carried by a user, said electronic device having a processor, a memory electrically connected to said processor and stored with an identification code, an application program and a biometric characteristics data for said application program to register said identification code on said controller of said smart lock device, a biometrics characteristics extractor electrically connected to said processor for retrieving biometric characteristics of said user, matching said retrieved biometric characteristics with said biometric characteristics data by said application program and producing a password for unlocking said smart lock device, an input unit electrically connected to said processor for registering at least one biometric characteristics button by said application program, said biometric characteristics button set corresponding to said password, and a Bluetooth transmitter electrically connected to said processor and set to produce a Bluetooth package of said password when said Bluetooth transmitter is activated; and a Bluetooth receiver coupled to said controller of said smart lock device, said Bluetooth receiver turned on automatically when said user is near said controller of said smart lock device within a predetermined distance for said controller to connect with said processor of said portable electronic device and to transmit said Bluetooth package to said controller via connection; Characterized in that the main-program predefines the identification code and driving circuit module at the pin of the controller, and each sub-program predefines the password to operate the lock device; whereby when the user is carrying the portable electronic device in the predetermined distance set in the Bluetooth receiver, the portable electronic device automatically transmits the Bluetooth package to the controller and when the biometric characteristics button is pressed, the controller is activated and operates the lock device via the driving circuit module, and when the main-program access the password, the main-program calls the password of the sub-program to make the controller enable to operate the lock device by the driving circuit module.

Furthermore, the biometric characteristics data is image data, voice data, fingerprints data, or any combination of the mentioned data. The image data is human face images, iris images, hand gesture images, or any gesture images of human body. The biometric characteristics of the user are images, voices, fingerprints, or any combination of the mentioned features of the user. The images of the user are human face images, iris images, hand gesture images and any gesture images of human body.

In addition, the biometric characteristics button is an image button, voice button, fingerprint button and any combination of the mentioned buttons. The image button is human face image button, iris image button, hand gesture image button and any gesture image buttons of human body.

The controller further includes a program encoded by a main program and a plurality of subroutines, said main program has the identification code defined in advance and each subroutine having a corresponding password defined for operation, upon the main program accessing the password, the subroutine with corresponding password is accessed and the controller has the driving circuit module arranged at a pin thereof operating the lock device.

Moreover, a digital touch screen is coupled to and disposed on a surface of the controller, said digital touch screen having at least one digital button set as password button for operation.

The input unit on the portable electronic device is a touch screen displaying the biometric characteristics buttons, and the processor has the application program displaying the password on the touch screen thereof and the password corresponds to the biometric characteristics button.

Moreover, the biometrics characteristics extractor can be an image extractor, a fingerprint extractor, a voice extractor, and the combination thereof.

Also, the controller includes a first circuit board and a control chip, the control chip is electronically connected to the first circuit board, and the Bluetooth receiver is electronically connected to the first circuit board, the Bluetooth receiver includes a receive chip and a receive circuit, the portable electronic device includes a second circuit board; the processor, the memory unit and the Bluetooth transmitter are electronically connected to the second circuit board, the Bluetooth transmitter includes a transmit chip and a transmit circuit for making the connection to be Blue tooth connection, the Bluetooth transmitter can transmit the Bluetooth packet to the Bluetooth receiver.

Based on the structures disclosed above, the present invention has the portable electronic device stored with a few biometric characteristics of the user for the user to unlock the smart lock device by the electronic device without being very close to the smart lock device. Even when the user is near the smart lock device, the smart lock device would not be accidentally operated via Bluetooth without the biometrics authentication. The present invention therefore achieves features of safety, convenience and less consuming of electricity.

DETAILED DESCRIPTION OF THE PREFERRED EMBODIMENT

Figure 1:
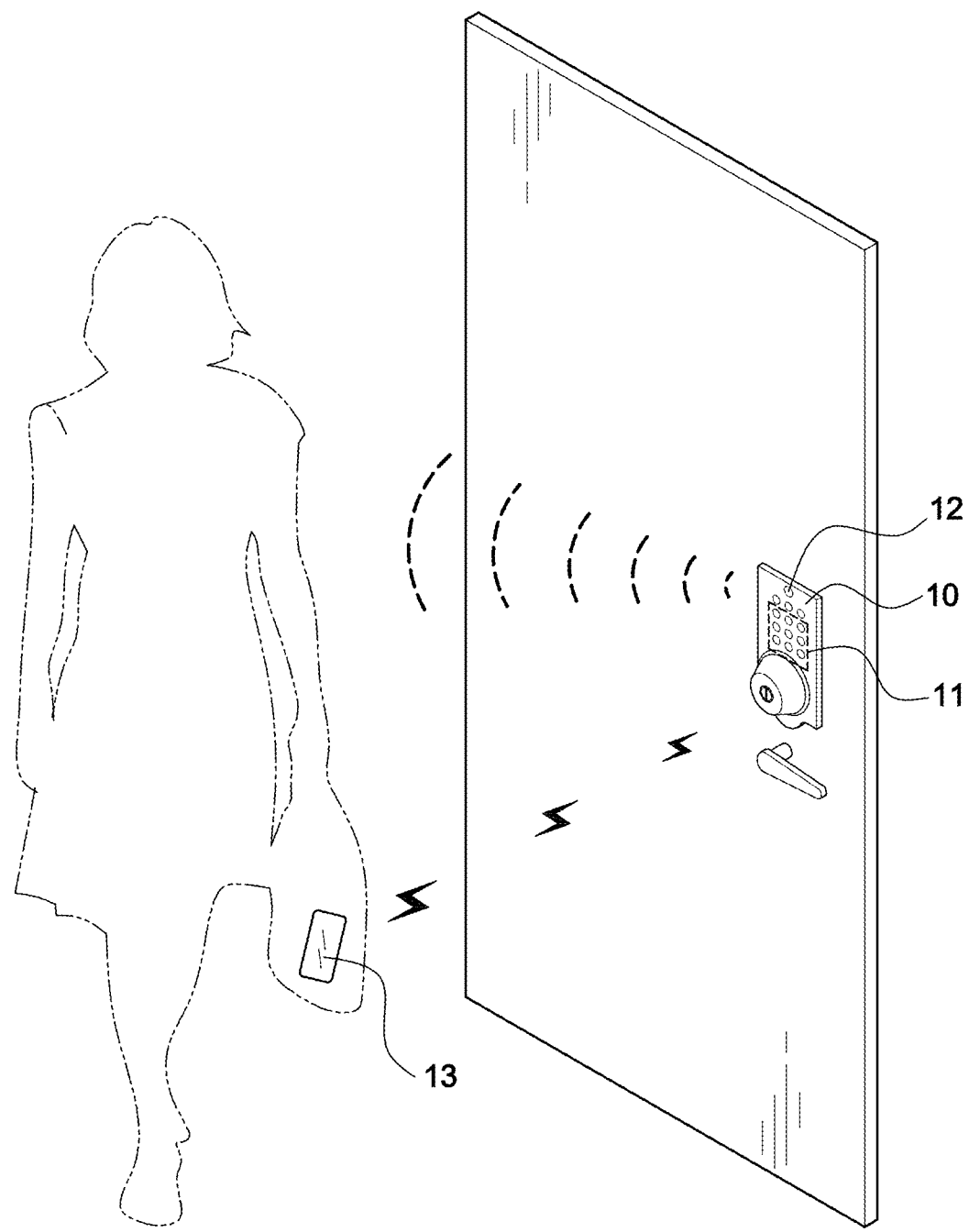
FIG. 1 is a schematic diagram of a conventional Bluetooth electronic lock.
Figure 2:
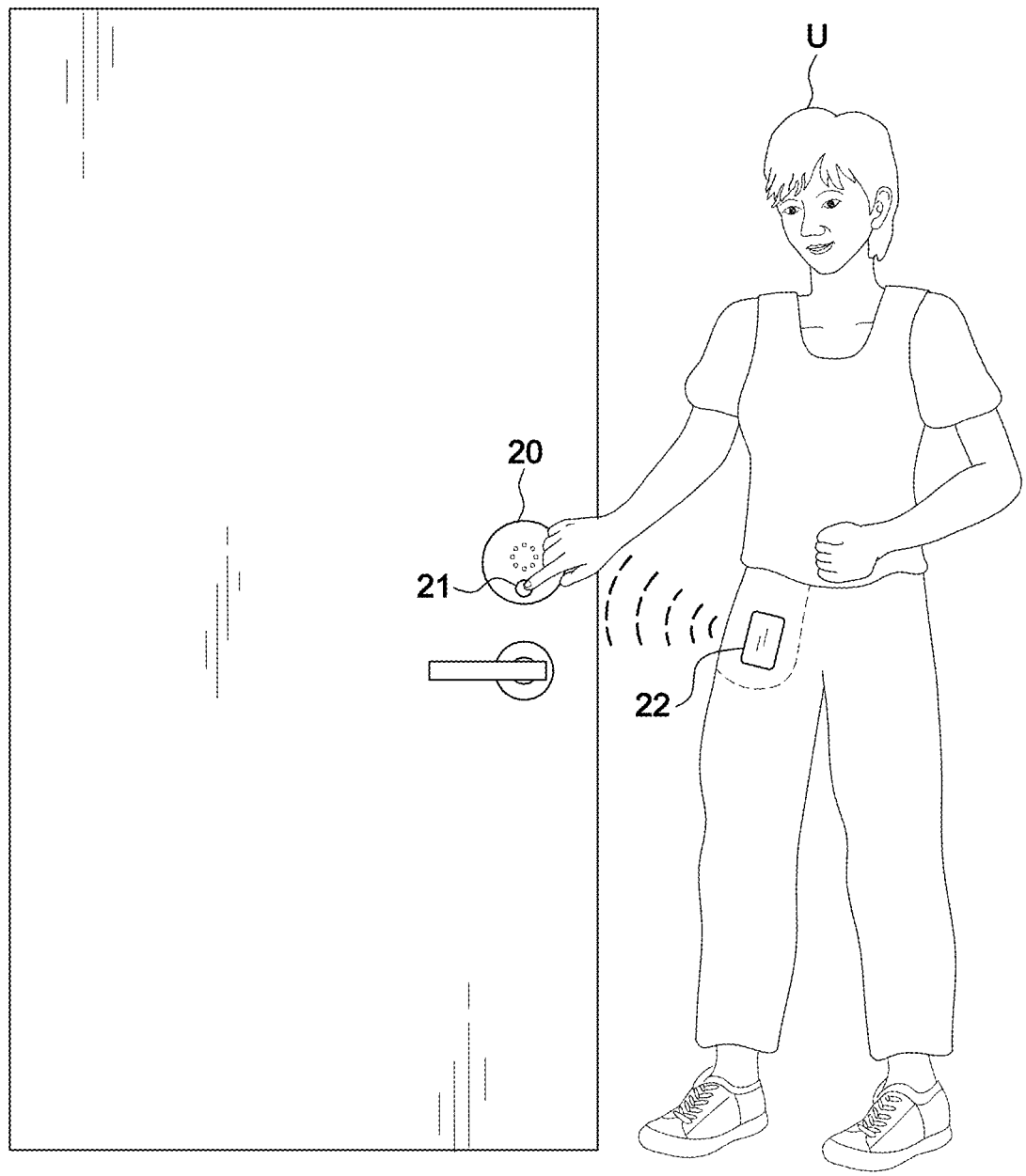
FIG. 2 is a schematic diagram of another conventional Bluetooth electronic lock.
Figure 3:
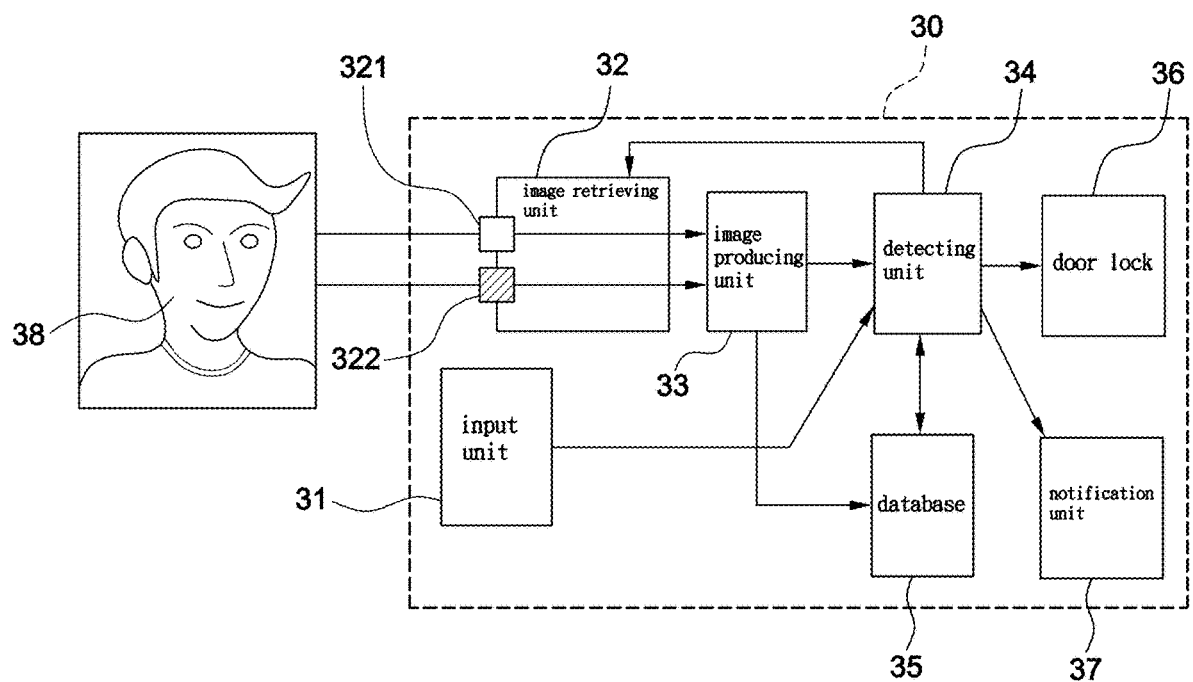
FIG. 3 is a schematic diagram of a conventional infrared image recognition system.

Referring to FIGS. 4A-11, the present invention is a smart locking system with biometrics authentication 90 and mainly includes a smart lock device 40, a digital touch screen 50, at least one portable electronic device 60 and a Bluetooth receiver 70.

The smart lock device 40 includes a lock device 41 and a controller 42. The controller 42 is coupled to a driving circuit module 43 for controlling locking and unlocking of the lock device 41. In this embodiment, the lock device 41 is any kind of lock for doors such as electromagnetic locks, electric strikes, anode locks, combination locks and electronic locks for doors, and the lock device 41, the controller 42 and the driving circuit module 43 can be separated disposed or integrated. The driving circuit module 43 further includes a driving circuit, a battery and a driving element; the driving element can be a motor, but the present invention is not limited to such application.

The digital touch screen 50 is coupled to and disposed on a surface of the controller 42 within a distance for a user U to easily access. The digital touch screen 50 has at least one digital button 51 set for controlling operation of the lock device 41. In this embodiment, the at least one digital button 51 is capacitive or resistive, but the present invention is not limited to such application.

The at least one electronic device 60 is carried by the user U and includes a processor 61, a memory 62, a biometrics characteristics extractor 63, an input unit 64 and a Bluetooth transmitter 65.

The memory 62 is electrically connected to the processor 61 and stores an identification code 621, an application program 622 and a biometric characteristics data 623 for the application program 622 to register the identification code 621 on the controller 42 of the smart lock device 40. The biometrics characteristics extractor 63 is electrically connected to the processor 61 for retrieving biometric characteristics 631 of the user U, matching the retrieved biometric characteristics 631 with the biometric characteristics data 623 by the application program 622 and producing at least one password 624 for unlocking the smart lock device 40.

The input unit 64 is electrically connected to the processor 61 for registering at least one biometric characteristics button 641 by the application program 622 for the at least one biometric characteristics button 641 to be set correspondingly to the at least one password 624. The Bluetooth transmitter 65 is electrically connected to the processor 61 and set to produce a Bluetooth package 651 of the at least one password 624 when the Bluetooth transmitter 65 is activated.

In this embodiment, the portable electronic device 60 is a smart phone, a smart watch, a tablet or a personal digital assistant, the biometrics characteristics extractor 63 can be composed of an image extractor 63A, a fingerprint extractor 63B, a voice extractor 63C and combination thereof, and the image extractor 63A is a camera, a fingerprint extractor 63B is a fingerprint sensor, a voice extractor 63C is a microphone; and the input unit 64 on the portable electronic device 60 is a touch screen displaying the at least one biometric characteristics button 641; however, the present invention is not limited to such application.

Furthermore, the biometric characteristics data 623 is image data, voice data, fingerprints data, or any combination of the mentioned data. The image data is human face images, iris images, hand gesture images, or any gesture images of human body. The biometric characteristics 631 of the user U are images, voices, fingerprints, or any combination of the mentioned features of the user U. The images of the user U are human face images, iris images, hand gesture images or any gesture images of human body. The biometric characteristics button 641 is an image button, voice button, fingerprint button or any combination of the mentioned buttons. The image button is human face image button, iris image button, hand gesture image button or any gesture image buttons of human body. But the present invention is not limited to such application.

The Bluetooth receiver 70 is coupled to the controller 42 of the smart lock device 40. The Bluetooth receiver 70 is turned on automatically when the user U is near the controller 42 of the smart lock device 40 within a predetermined distance for the controller 42 to connect with the processor 61 of the portable electronic device 60 and to transmit the Bluetooth package 651 to the controller 42 via a connection 80.

Figure 4A:
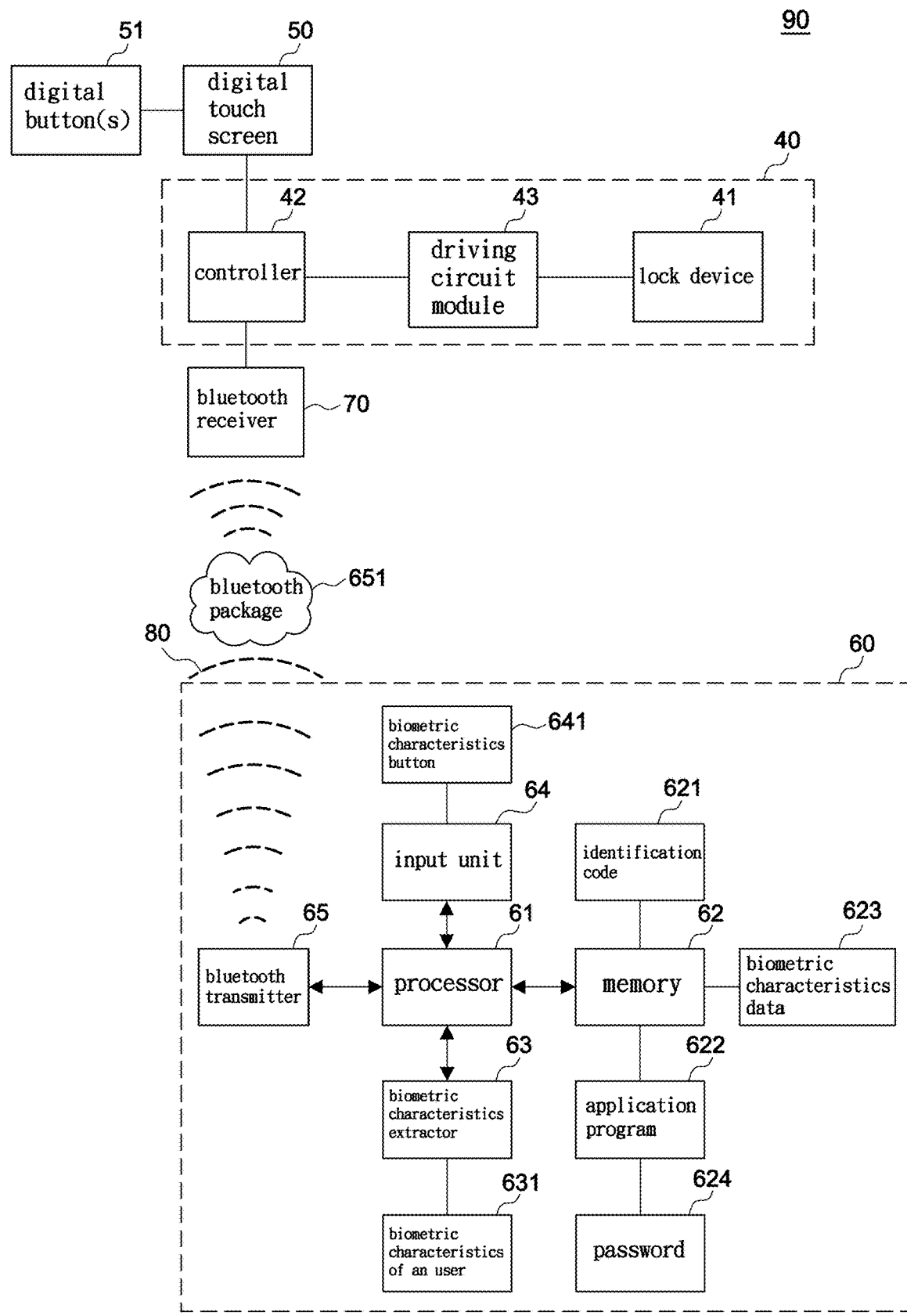
FIG. 4A is a block diagram of the present invention.
Figure 4B:
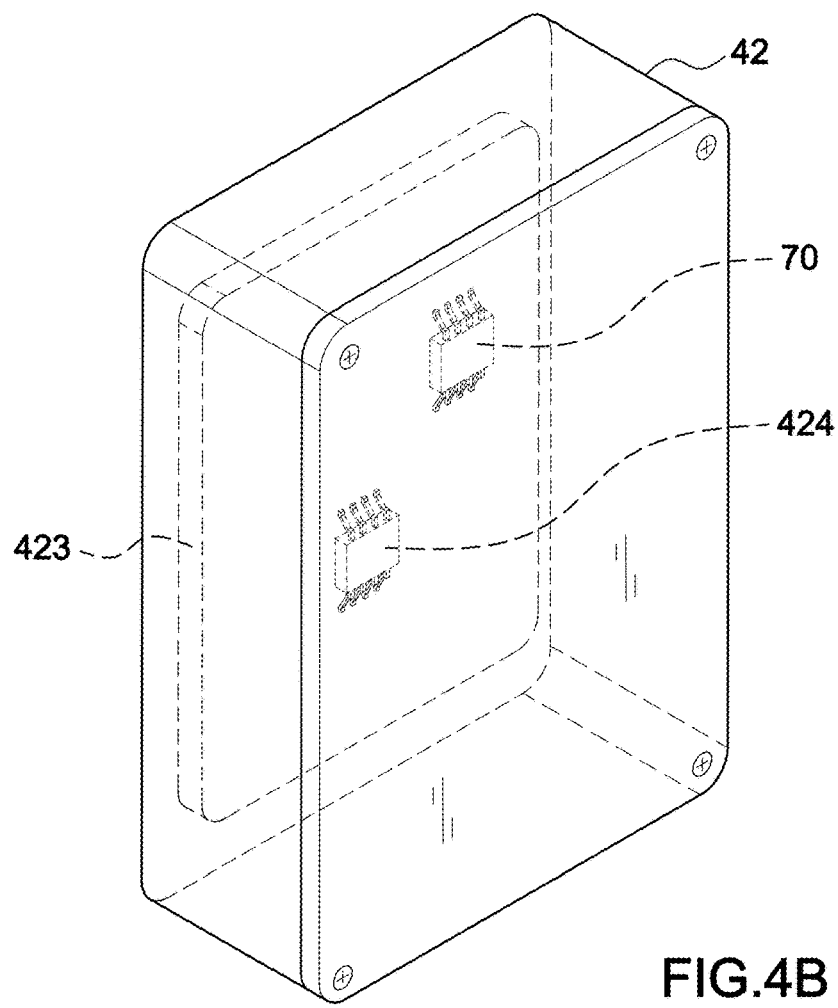
FIG. 4B is a schematic diagram illustrating the control chip and the Bluetooth receiver electronically connect to the first circuit board.
Figure 4C:
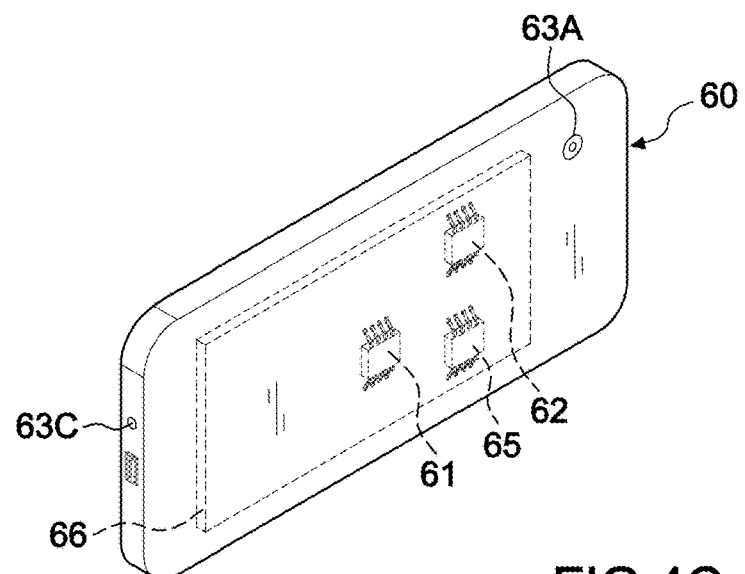
FIG. 4C is a schematic diagram illustrating the processor, the memory and the Bluetooth transmitter electronically connect to the second circuit board.
Figure 4D:
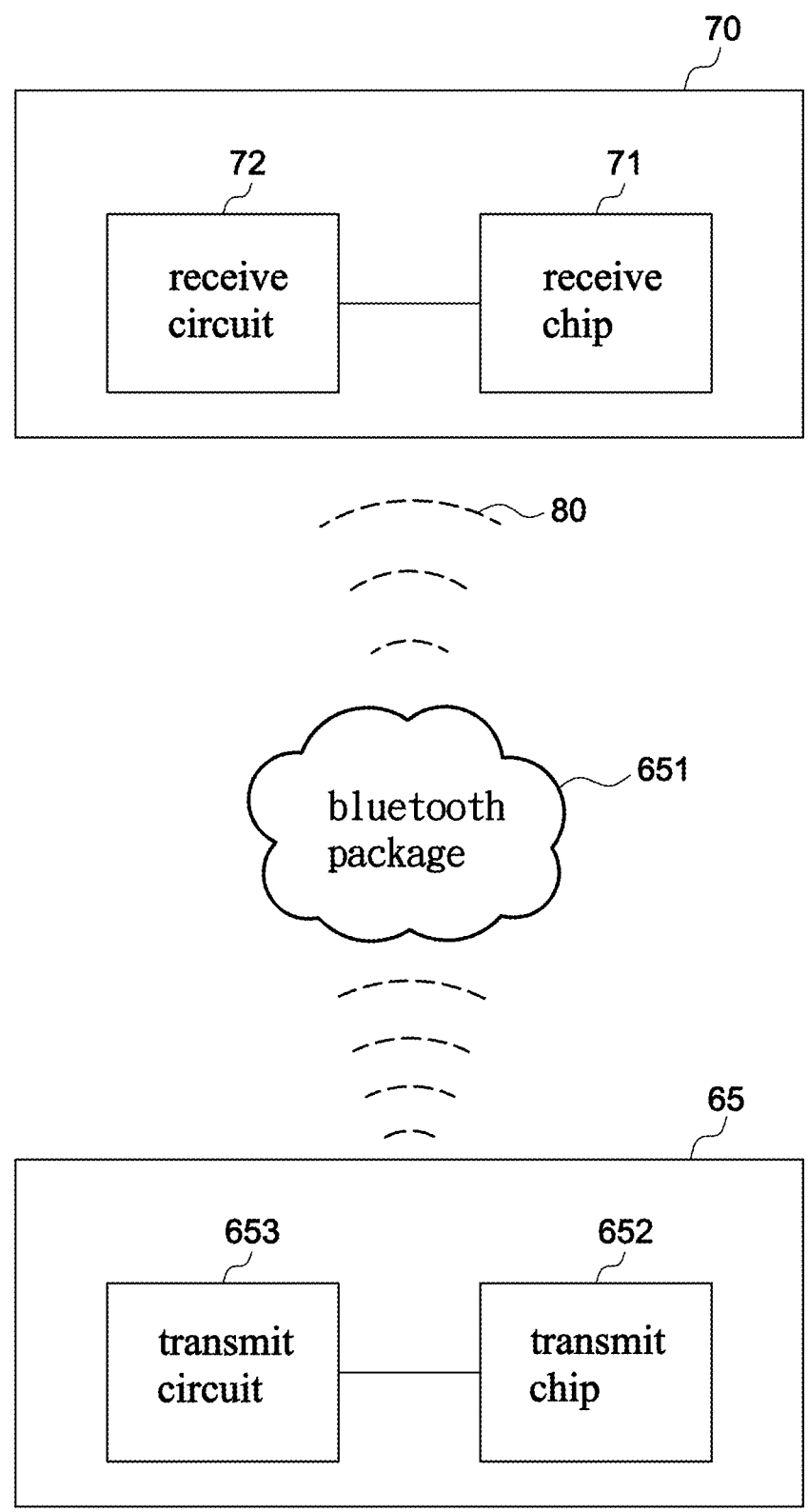
FIG. 4D is a block diagram of the circuit of the Bluetooth receiver and the Bluetooth transmitter the present invention.
Figure 5:
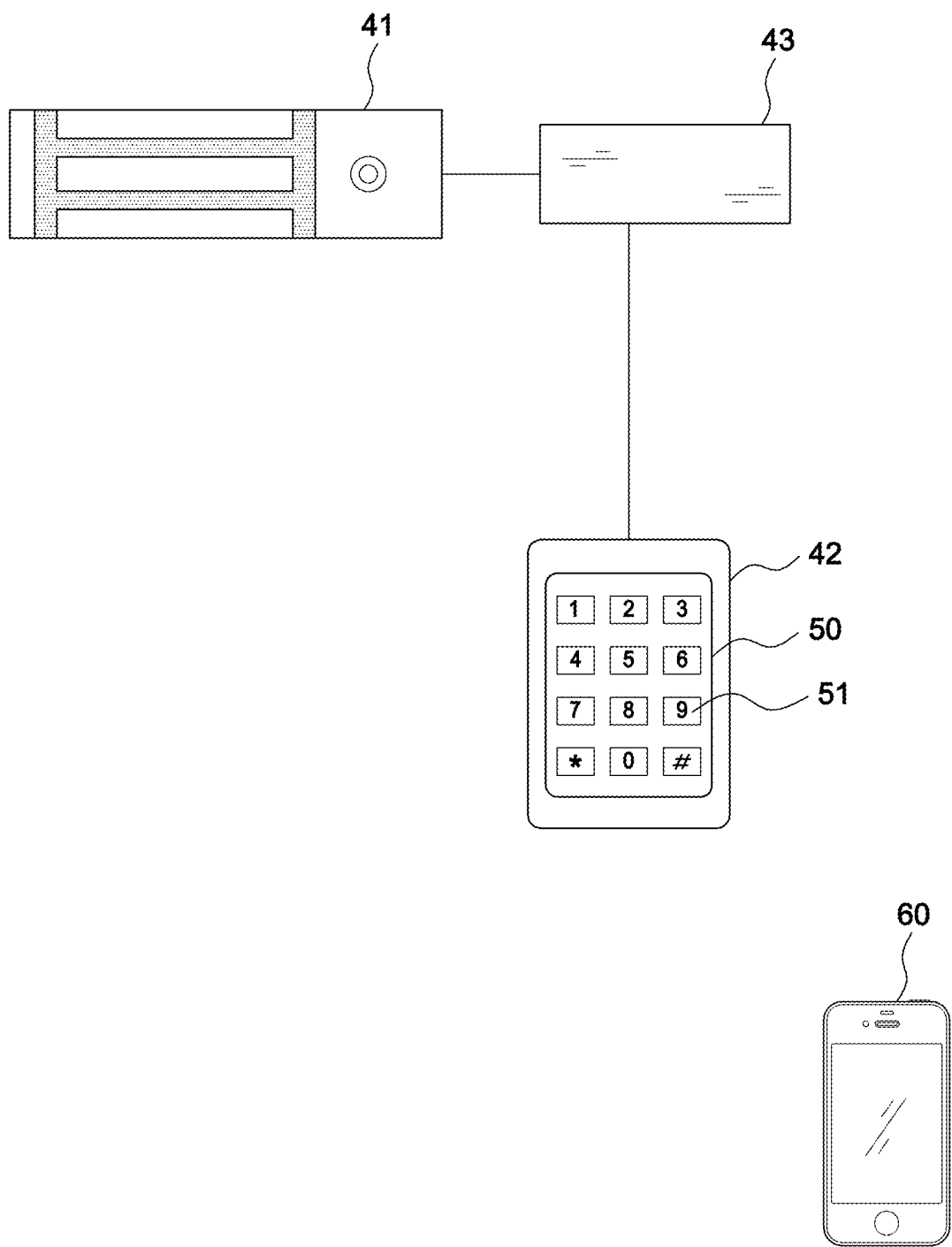
FIG. 5 is a schematic diagram of operation of the present invention.

Also, referring to FIG. 4B-4D, in this embodiment, the controller 42 includes a first circuit board 423 and a control chip 424, the control chip 424 is electronically connected to the first circuit board 423, and the Bluetooth receiver 70 is electronically connected to the first circuit board 423, the Bluetooth receiver 70 includes a receive chip 71 and a receive circuit 72, the portable electronic device 60 includes a second circuit board 66; the processor 61, the memory 62 and the Bluetooth transmitter 65 are electronically connected to the second circuit board 66, the Bluetooth transmitter 65 includes a transmit chip 652 and a transmit circuit 653 for making the connection 80 to be Blue tooth connection, let the Bluetooth transmitter 65 enable to transmit the Bluetooth packet 651 to the Bluetooth receiver 70, but the present invention is not limited to such application. Furthermore, the image extractor 63A, the fingerprint extractor 63B and the voice extractor 63C can be coupled to the second circuit board 66, making the image extractor 63A, the fingerprint extractor 63B and the voice extractor 63C to be electronically connected, but the present invention is not limited to such application.

Figure 6:
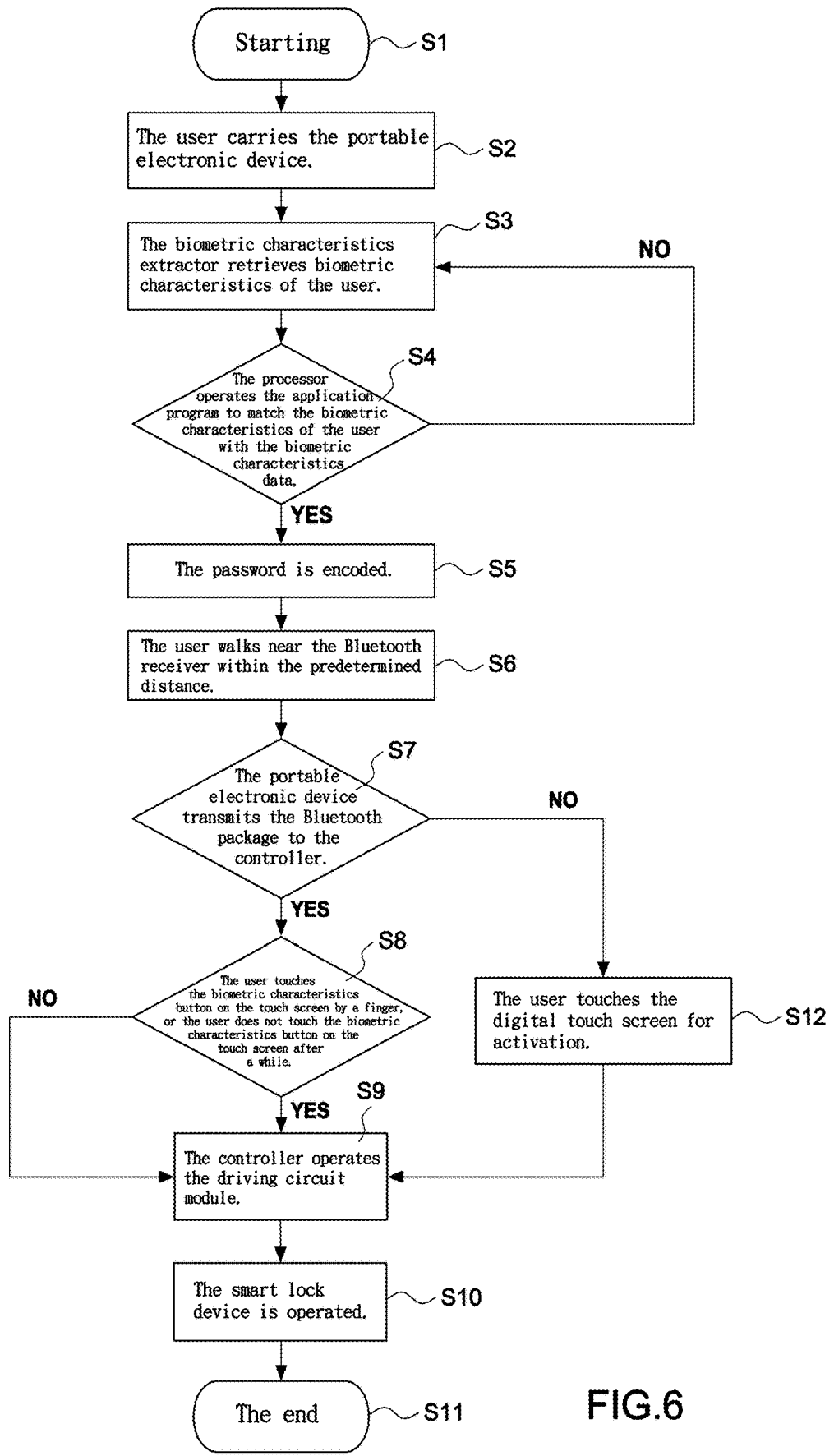
FIG. 6 is a flow diagram of a user performing operation of a smart lock device according to the present invention.

Referring to FIG. 6, the unlocking process by the user U is described in the following steps.

Step 1 S1: Starting.

Step 2 S2: The user U carries the portable electronic device 60.

Step 3 S3: The biometrics characteristics extractor 63 retrieves biometric characteristics of the user 631.

Step 4 S4: The processor 61 operates the application program 622 to match the biometric characteristics of the user 631 with the biometric characteristics data 623.

Step 5 S5: The password 624 is encoded.

Step 6 S6: The user U walks near the Bluetooth receiver 70 within the predetermined distance.

Step 7 S7: The portable electronic device 60 transmits the Bluetooth package 651 to the controller 42.

Step 8 S8: The user U touches the biometric characteristics button 641 on the touch screen by a finger, or the user U does not touch the biometric characteristics button 641 on the touch screen after a while.

Step 9 S9: The controller operates the driving circuit module 43.

Step 10 S10: The smart lock device 40 is operated.

Step 11 S11: The end.

In Step 7 S7, if the portable electronic device 60 does not transmit the Bluetooth package 651 to the controller 42, the user U can still go to Step 12 S12: The user U touches the digital touch screen 50 for activation. Then the user U can go back to Step 9 S9, and then follow the process to Step 11 S11.

Figure 7A:
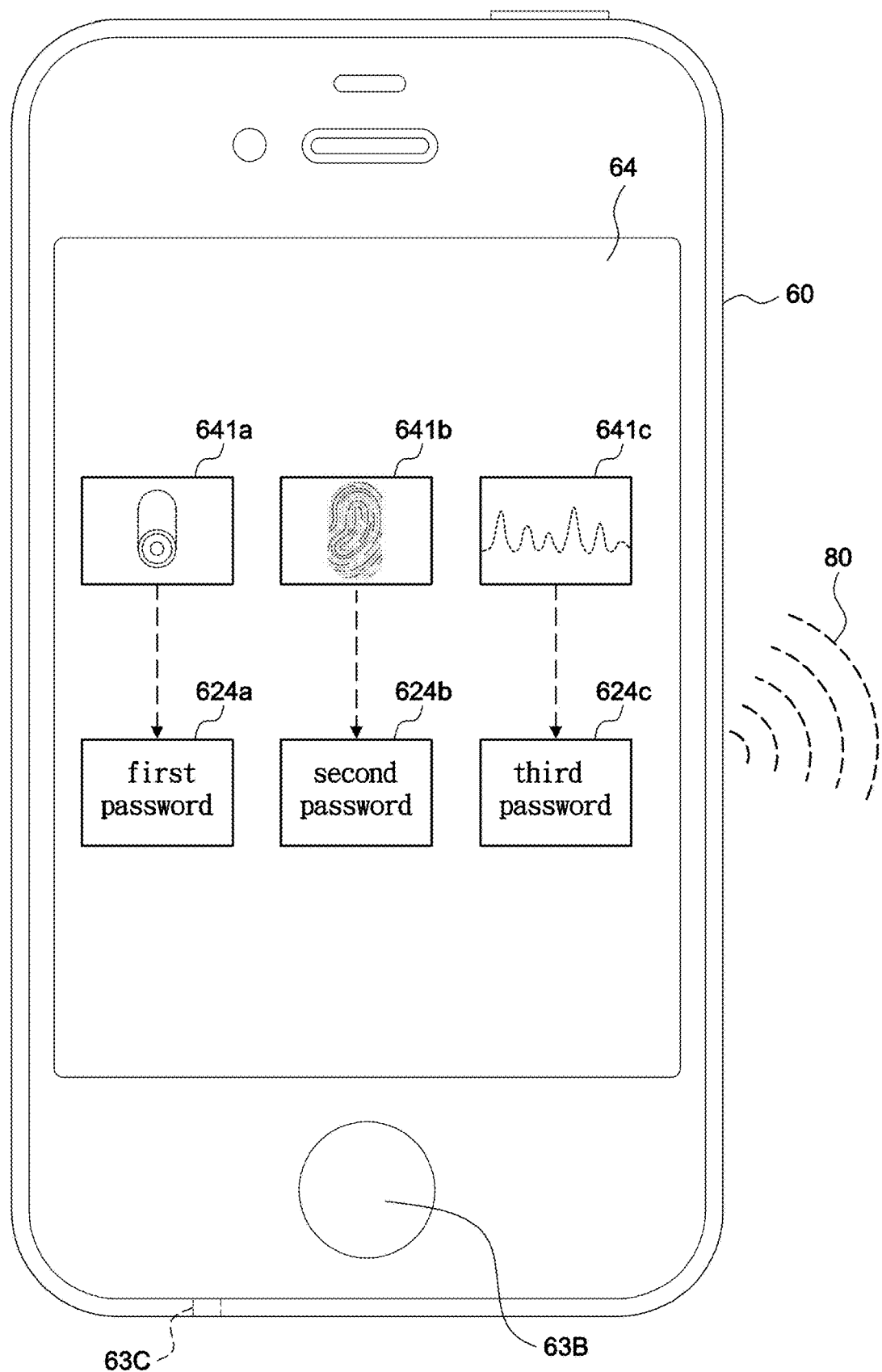
FIG. 7A is a schematic diagram illustrating operation of an application program according to the present invention.

Referring to FIG. 7A, the processor 61 has the application program 622 individually match the image features, voice features or fingerprints features of the user U with the corresponding image data, voice data or fingerprints data, and produce a first password 624*a*, a second password 624*b* or a third password 624*c*. The first, second and third password 624*a*, 624*b*, 624*c* further has a corresponding image button 641*a*, a corresponding fingerprint button 641*b* or a corresponding voice button 641*c* so that the controller 42 is able to operate the lock device 41 by the driving circuit module 43. However, the present invention is not limited to such application.

Figure 7B:
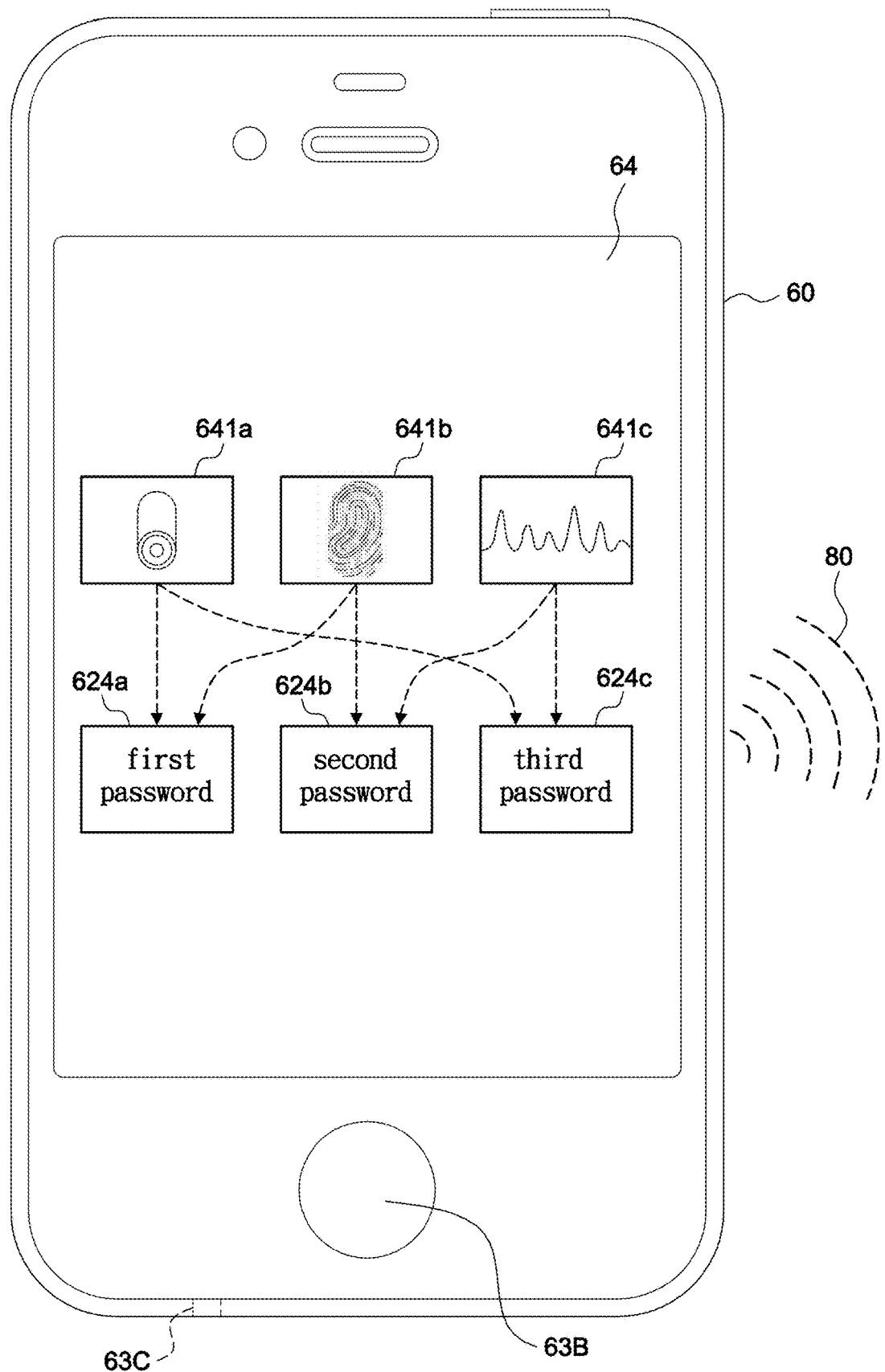
FIG. 7B is another schematic diagram illustrating operation of an application program according to the present invention.

Referring to FIG. 7B, the image features and the fingerprint features of the user U are encoded into the first password 624*a*; the voice features and the fingerprint features of the user U are encoded into the second password 624*b*; the image features and the voice features of the user U are encoded into the third password 624*c*. When touching the corresponding buttons, the controller 42 would operate the lock device 41 by the driving circuit module 43, but the present invention is not limited to such application. Furthermore, the touch screen 64 displays buttons of the first, second and third passwords 624a, 624b, 624c.

Figure 7C:
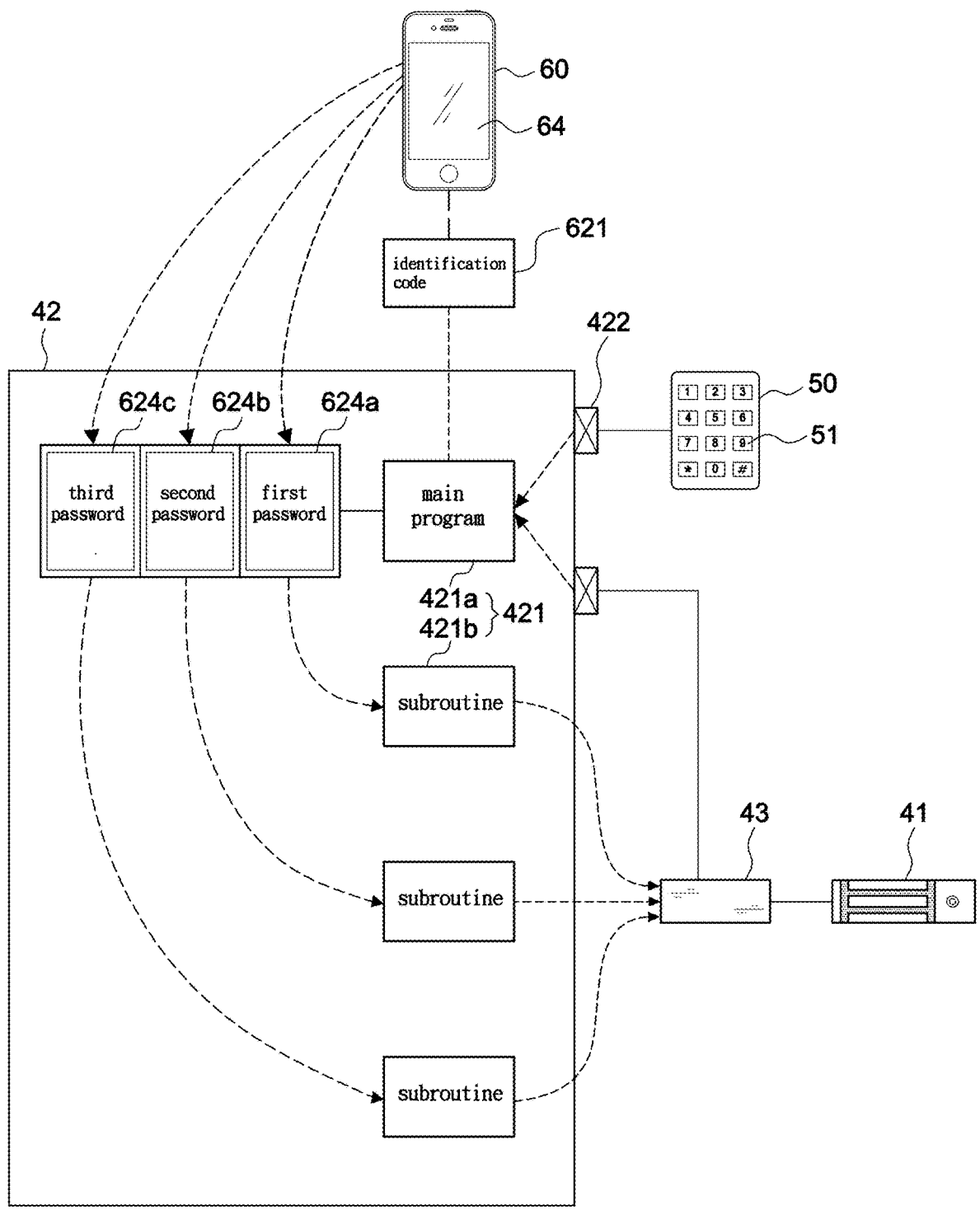
FIG. 7C is a schematic diagram illustrating operation of a program according to the present invention.

Referring to FIG. 7C, the controller 42 further includes a program 421 encoded by a main program 421a and a plurality of subroutines 421b. The main program 421a has the identification code 621 defined in advance and each subroutine 421b has a corresponding password defined for operation. Upon the main program 421a accessing the password, the subroutine 421b with corresponding password is accessed and the controller 42 has the driving circuit module 43 arranged at a pin 422 thereof operating the lock device 41. But the present invention is not limited to such application.

Figure 8:
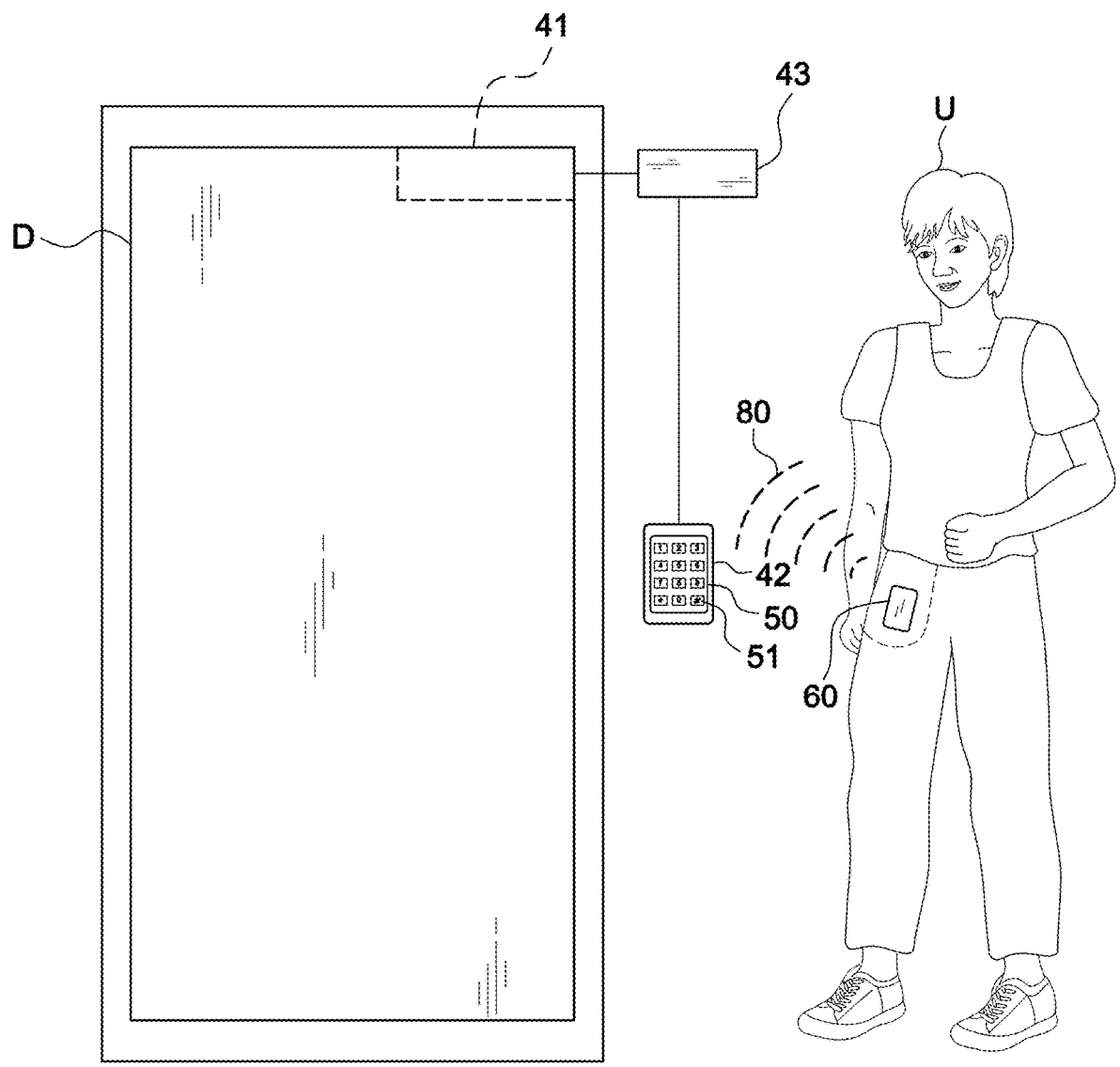
FIG. 8 is a practical application view of a portable electronic device connected to the smart lock device via Bluetooth according to the present invention.
Figure 9:
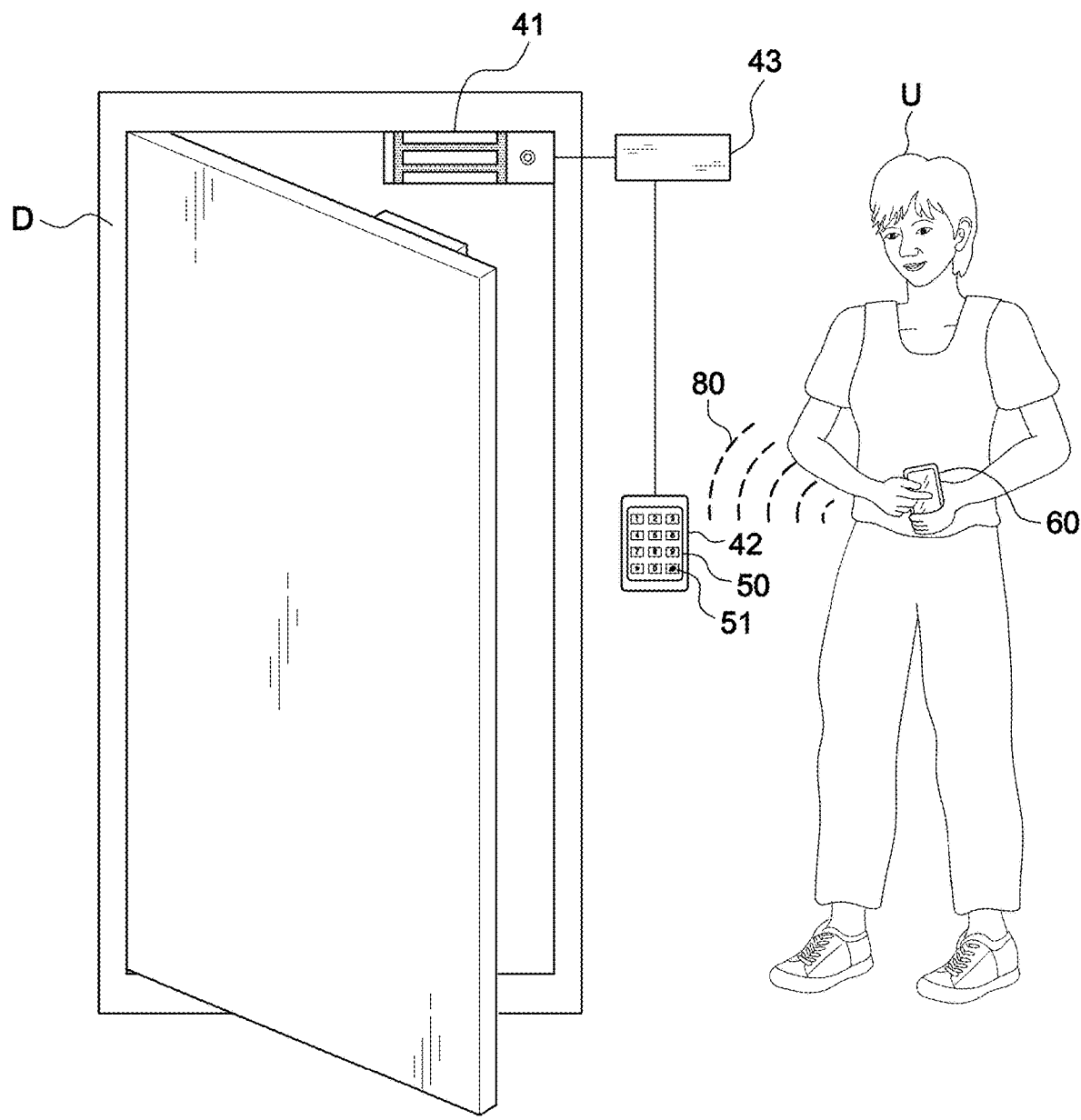
FIG. 9 is a practical application view illustrating unlocking the smart lock device according to the present invention.

Referring to FIG. 8, the smart locking system with biometrics authentication 90 is installed near the periphery of a door D and the lock device 41, the controller 42 and the driving circuit module 43 can be separated installed to form the smart lock device 80. When the user U is carrying the portable electronic device 60 in the predetermined distance set in the Bluetooth receiver 70, the portable electronic device 60 would connect with the smart lock device 40 via Bluetooth for authentication and the portable electronic device 60 automatically transmits the Bluetooth package 651 to the controller 42. Then referring to FIG. 9, when the biometric characteristics button 641 is touched and pressed by the user U, the controller 42 is activated and operates the lock device 41 via the driving circuit module 43 for unlocking the smart lock device 40.

Figure 10:
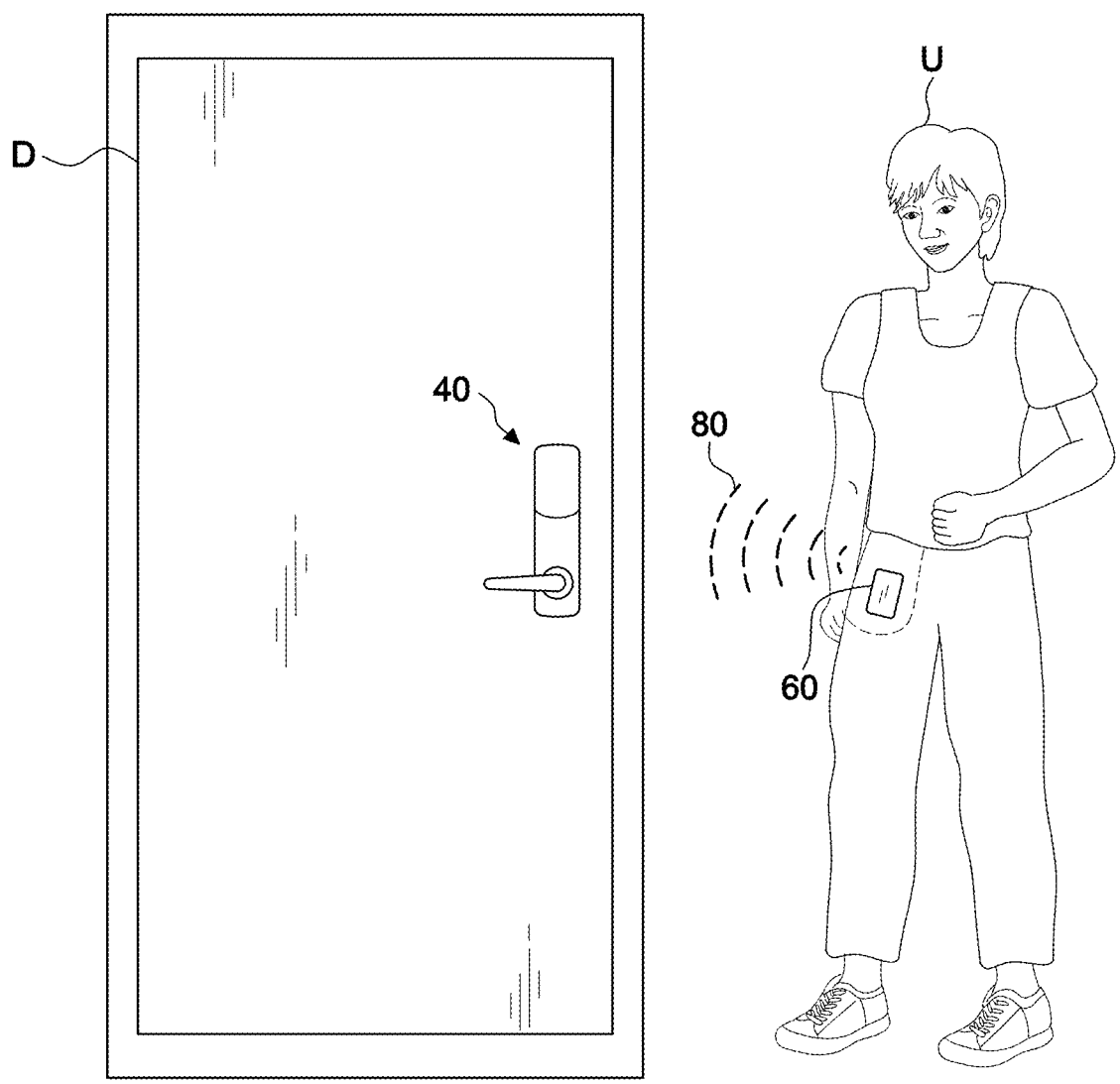
FIG. 10 is another practical application view of the portable electronic device connected to the smart lock device via Bluetooth according to the present invention.
Figure 11:
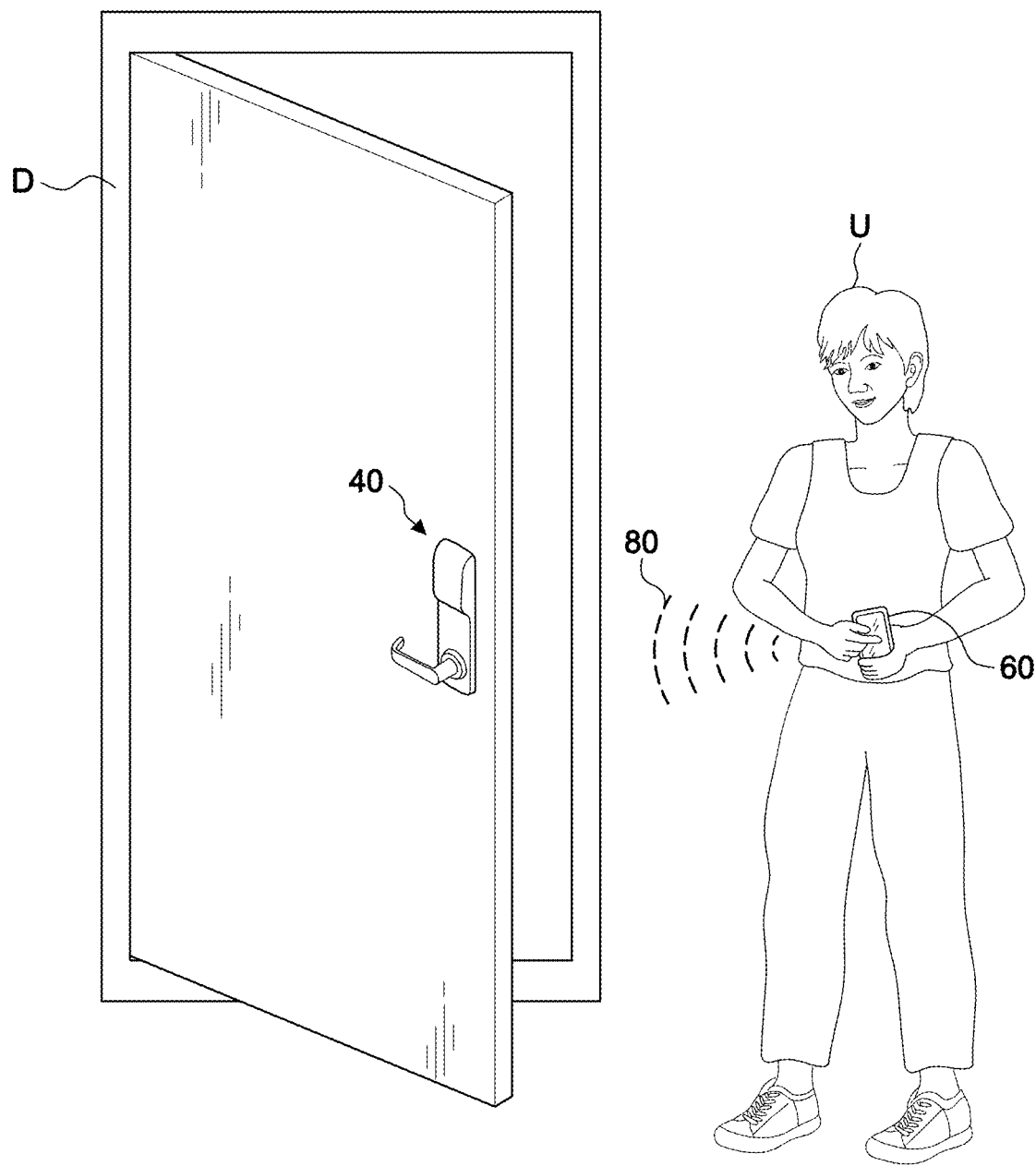
FIG. 11 is another practical application view illustrating unlocking the smart lock device according to the present invention.

Referring to FIG. 10, the lock device 41, the controller 42 and the driving circuit module 43 can be integrated into one device to form the smart lock device 80. When the user U is carrying the portable electronic device 60 in the predetermined distance set in the Bluetooth receiver 70, the portable electronic device 60 would connect with the smart lock device 40 via Bluetooth for authentication and the portable electronic device 60 automatically transmits the Bluetooth package 651 to the controller 42. Then referring to FIG. 11, when the biometric characteristics button 641 is touched and pressed by the user U, the controller 42 is activated and operates the lock device 41 via the driving circuit module 43 for unlocking the smart lock device 40. In addition, the system is able to transmit the password 624 via virtual storage space to another user U with the portable electronic device 60 for unlocking.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A smart locking system with biometrics authentication, comprising:
    a smart lock device including a lock device and a controller, said controller coupled to a driving circuit module for controlling locking and unlocking of said lock device, the controller has a program code, and the program code is wrote by a main-program and multiple sub-programs;
    at least one portable electronic device carried by a user, said portable electronic device having a processor, a memory electrically connected to said processor and stored with an identification code, an application program and a biometric characteristics data for said application program to register said identification code on said controller of said smart lock device, a biometrics characteristics extractor electrically connected to said processor for retrieving biometric characteristics of said user, matching said retrieved biometric characteristics with said biometric characteristics data by said application program and producing a password for unlocking said smart lock device, an input unit electrically connected to said processor for registering at least one biometric characteristics button by said application program, said biometric characteristics button set corresponding to said password, and a Bluetooth transmitter electrically connected to said processor and set to produce a Bluetooth package of said password when said Bluetooth transmitter is activated; and
    a Bluetooth receiver coupled to said controller of said smart lock device, said Bluetooth receiver turned on automatically when said user is near said controller of said smart lock device within a predetermined distance for said controller to connect with said processor of said portable electronic device and to transmit said Bluetooth package to said controller via connection;
    characterized in that the main-program predefines the identification code and driving circuit module at a pin of the controller, and each sub-program predefines the password to operate the lock device;
    whereby when the user is carrying the portable electronic device in the predetermined distance set in the Bluetooth receiver, the portable electronic device automatically transmits the Bluetooth package to the controller and when the biometric characteristics button is pressed, the controller is activated and operates the lock device via the driving circuit module, and when the main-program accesses the password, the main-program calls the password of the sub-program to make the controller enabled to operate the lock device by the driving circuit module.

2. The smart locking system with biometrics authentication as claimed in claim 1, wherein the biometric characteristics data is image data, voice data, fingerprints data, or any combination of the mentioned data.

3. The smart locking system with biometrics authentication as claimed in claim 2, wherein the image data is human face images, iris images, hand gesture images, and any gesture images of human body.

4. The smart locking system with biometrics authentication as claimed in claim 1, wherein the biometric characteristics of the user are images, voices, fingerprints, and any combination of the mentioned features of the user.

5. The smart locking system with biometrics authentication as claimed in claim 4, wherein the images of the user are human face images, iris images, hand gesture images and any gesture images of human body.

6. The smart locking system with biometrics authentication as claimed in claim 1, wherein the biometric characteristics button is an image button, voice button, fingerprint button and any combination of the mentioned buttons.

7. The smart locking system with biometrics authentication as claimed in claim 6, wherein the image button is human face image button, iris image button, hand gesture image button and any gesture image buttons of human body.

8. The smart locking system with biometrics authentication as claimed in claim 1, wherein the controller further includes a program encoded by a main program and a plurality of subroutines, said main program has the identification code defined in advance and each subroutine having a corresponding password defined for operation, upon the main program accessing the password, the subroutine with corresponding password is accessed and the controller has the driving circuit module arranged at the pin thereof operating the lock device.

9. The smart locking system with biometrics authentication as claimed in claim 8, wherein a digital touch screen is coupled to and disposed on a surface of the controller, said digital touch screen having at least one digital button set as password button for operation.

10. The smart locking system with biometrics authentication as claimed in claim 1, wherein the input unit on the portable electronic device is a touch screen displaying the biometric characteristics buttons.

11. The smart locking system with biometrics authentication as claimed in claim 1, wherein biometrics characteristics extractor can be an image extractor, a fingerprint extractor, a voice extractor and combination thereof.

12. The smart locking system with biometrics authentication as claimed in claim 1, wherein the controller includes a first circuit board and a control chip, the control chip is electronically connected to the first circuit board, and the Bluetooth receiver is electronically connected to the first circuit board, the Bluetooth receiver includes a receive chip and a receive circuit, the portable electronic device includes a second circuit board; the processor, the memory and the Bluetooth transmitter are electronically connected to the second circuit board, the Bluetooth transmitter includes a transmit chip and a transmit circuit for making the connection to be Blue tooth connection, let the Bluetooth transmitter enable to transmit the Bluetooth packet to the Bluetooth receiver.

* * * * *